US010697713B2

(12) United States Patent
Bradbury et al.

(10) Patent No.: US 10,697,713 B2
(45) Date of Patent: Jun. 30, 2020

(54) GAS-FIRED TUBE SWAGED JOINT

(71) Applicant: Trane International Inc., Piscataway, NJ (US)

(72) Inventors: Dennis Scott Bradbury, Laneville, TX (US); Delbert Steven Christopher, Reklaw, TX (US); Jeffery Wayne O'Daniel, Quitman, TX (US)

(73) Assignee: Trane International Inc., Davidson, NC (US)

( * ) Notice: Subject to any disclaimer, the term of this patent is extended or adjusted under 35 U.S.C. 154(b) by 1071 days.

(21) Appl. No.: 14/755,369

(22) Filed: Jun. 30, 2015

(65) Prior Publication Data

US 2016/0003559 A1   Jan. 7, 2016

Related U.S. Application Data

(60) Provisional application No. 62/020,137, filed on Jul. 2, 2014.

(51) Int. Cl.
| | | |
|---|---|---|
| F28D 21/00 | (2006.01) | |
| F16L 41/08 | (2006.01) | |
| F24H 3/08 | (2006.01) | |
| F24H 9/14 | (2006.01) | |

(52) U.S. Cl.
CPC ........ F28D 21/0003 (2013.01); F16L 41/082 (2013.01); F24H 3/087 (2013.01); F24H 9/146 (2013.01)

(58) Field of Classification Search
None
See application file for complete search history.

(56) References Cited

U.S. PATENT DOCUMENTS

| | | | | |
|---|---|---|---|---|
| 1,397,080 A | * | 11/1921 | Coleman | F16L 41/001 285/211 |
| 1,714,703 A | * | 5/1929 | Walton | F16L 41/001 285/211 |
| 1,847,837 A | * | 3/1932 | Klopper | F16L 13/04 285/381.1 |
| 1,862,796 A | * | 6/1932 | Martin, Jr. | F16L 41/084 285/189 |
| 1,911,775 A | * | 5/1933 | Smith | B21D 39/04 29/517 |
| 2,039,009 A | * | 4/1936 | Lampman | F16L 41/088 285/137.11 |

(Continued)

OTHER PUBLICATIONS

SCAQMD (South Coast Air Quality Management District); SCAQMD Rule Book, Regulation XI, Rule 1111; http://www.aqmd.gov/home/regulations/rules/scaqmd-rule-book/regulation-xi; Sep. 5, 2014; 7 pages.

*Primary Examiner* — Avinash A Savani
*Assistant Examiner* — Martha M Becton
(74) *Attorney, Agent, or Firm* — Conley Rose, P.C.; J. Robert Brown, Jr.; Kristian R. Sullivan

(57) ABSTRACT

A heat exchange system for heating, ventilation, and air conditioning (HVAC) may comprise a burner box, a hot collector box, and a heat exchanger tube. The heat exchanger tube may be disposed between, and in fluid communication with, the hot collector box and the burner box. The heat exchanger tube may be rigidly connected to at least one of the hot collector box or burner box by a swaged joint.

20 Claims, 7 Drawing Sheets

(56) References Cited

U.S. PATENT DOCUMENTS

| | | | | |
|---|---|---|---|---|
| 2,137,223 A * | 11/1938 | Baxter | F16L 41/14 | 285/139.1 |
| 2,149,696 A * | 3/1939 | Holmes | B21D 53/02 | 122/44.2 |
| 2,211,178 A * | 8/1940 | Stone | F16L 13/0209 | 29/890.15 |
| 2,217,193 A * | 10/1940 | Aronson | B21K 21/08 | 148/684 |
| 2,314,315 A * | 3/1943 | Scheele | E03C 1/22 | 285/213 |
| 2,382,489 A * | 8/1945 | Koppel | F16L 41/084 | 285/205 |
| 2,482,944 A * | 9/1949 | Shore | F16L 41/084 | 285/203 |
| 2,527,937 A * | 10/1950 | Klug | F24H 3/087 | 126/108 |
| 2,592,980 A * | 4/1952 | Van Wert | F24H 1/40 | 122/155.1 |
| 2,709,381 A * | 5/1955 | Enghauser | B21D 41/045 | 228/2.3 |
| 2,722,048 A * | 11/1955 | Gier, Jr. | B21D 53/08 | 165/185 |
| 2,756,078 A * | 7/1956 | Klingler | E03C 1/14 | 4/650 |
| 3,068,563 A * | 12/1962 | Reverman | B21D 39/04 | 29/458 |
| 3,129,020 A * | 4/1964 | Bujnowski | E03C 1/22 | 285/110 |
| 3,223,078 A * | 12/1965 | Miller | F24H 3/087 | 126/109 |
| 3,232,643 A * | 2/1966 | Mikeska | F16L 5/02 | 285/141.1 |
| 3,270,780 A * | 9/1966 | Kydd | F16L 9/14 | 138/148 |
| 3,343,252 A * | 9/1967 | Reesor | F16L 13/103 | 29/458 |
| 3,468,014 A * | 9/1969 | Paul | B21D 39/06 | 228/189 |
| 3,514,128 A * | 5/1970 | Rohrberg | B64C 1/10 | 285/141.1 |
| 3,572,779 A * | 3/1971 | Dawson | F16L 13/146 | 285/382.2 |
| 3,596,939 A * | 8/1971 | Gibson | F16L 13/161 | 285/382.2 |
| 3,604,102 A * | 9/1971 | Boccalari | B21C 23/22 | 228/131 |
| 3,703,194 A * | 11/1972 | Giordano | E04D 13/0641 | 138/109 |
| 3,759,551 A * | 9/1973 | Broske | B21D 39/042 | 285/18 |
| 3,893,718 A * | 7/1975 | Powell | F16L 13/142 | 285/53 |
| 3,912,306 A * | 10/1975 | McCormick | F01N 13/1805 | 285/12 |
| 3,929,356 A * | 12/1975 | DeVincent | B60H 1/00571 | 285/305 |
| 4,061,367 A * | 12/1977 | Moebius | F16L 13/146 | 285/382.2 |
| 4,130,932 A * | 12/1978 | Epmeier | B21D 39/06 | 285/382.5 |
| 4,159,035 A * | 6/1979 | Chartet | F16L 41/001 | 165/173 |
| 4,330,924 A * | 5/1982 | Kushner | B21D 39/04 | 285/382.2 |
| 4,333,525 A * | 6/1982 | Ikin | F28D 15/02 | 165/104.21 |
| 4,426,959 A * | 1/1984 | McCurley | F16L 5/14 | 122/33 |
| 4,437,217 A * | 3/1984 | Lallaye | F28F 21/04 | 165/133 |
| 4,438,705 A * | 3/1984 | Basic, Sr. | F23G 5/165 | 110/190 |
| 4,450,612 A * | 5/1984 | Kelly | B21D 39/203 | 29/421.1 |
| 4,541,655 A * | 9/1985 | Hunter | B21D 39/04 | 285/382.2 |
| 4,740,017 A * | 4/1988 | Grabowski | F16L 31/02 | 156/294 |
| 4,742,204 A * | 5/1988 | Canter, Jr. | B23K 9/0035 | 219/137 R |
| 4,768,587 A * | 9/1988 | Halder | F16L 37/144 | 165/177 |
| 4,968,067 A * | 11/1990 | Whiteside | F16L 37/144 | 285/305 |
| 5,167,056 A * | 12/1992 | McGuire | F16L 55/1652 | 29/234 |
| 5,214,835 A * | 6/1993 | McGuire | B29C 55/30 | 29/447 |
| 5,271,376 A * | 12/1993 | Lu | F24H 3/105 | 126/110 R |
| 5,333,917 A * | 8/1994 | Davey | F16L 41/086 | 248/56 |
| 5,429,268 A * | 7/1995 | Hale | F17C 1/00 | 206/443 |
| 5,681,159 A * | 10/1997 | Benedek | F23C 7/00 | 126/115 |
| 5,749,138 A * | 5/1998 | Usui | F16L 13/142 | 29/515 |
| 5,775,318 A * | 7/1998 | Haydock | F24H 3/087 | 126/110 R |
| 5,784,918 A * | 7/1998 | Shao-Chien | B21C 37/20 | 29/423 |
| 6,059,338 A * | 5/2000 | Diederichs | F16L 13/161 | 285/55 |
| 6,071,115 A * | 6/2000 | Carbone | F23C 7/00 | 431/10 |
| 6,485,294 B2 * | 11/2002 | Riepenhoff | F23M 9/06 | 126/116 A |
| 6,910,618 B2 * | 6/2005 | Gendron | B23K 33/00 | 228/168 |
| 6,997,636 B2 * | 2/2006 | Tremouilhac | E03F 5/046 | 210/163 |
| 7,360,591 B2 * | 4/2008 | Ring | E21B 43/103 | 166/207 |
| 7,484,772 B2 * | 2/2009 | Thorensen | F16L 13/143 | 285/139.2 |
| 7,988,203 B2 * | 8/2011 | Martin | F16L 41/088 | 285/109 |
| 8,074,356 B2 * | 12/2011 | Branyon | B21D 53/08 | 29/890.044 |
| 8,161,620 B2 * | 4/2012 | Ficker | B21H 1/06 | 29/505 |
| 8,534,642 B2 * | 9/2013 | Moretz | F16J 15/061 | 251/314 |
| 8,561,601 B2 * | 10/2013 | Schneberger | F24H 3/087 | 126/99 R |
| 9,400,068 B2 * | 7/2016 | Heraud | F16L 13/103 | |
| 9,964,333 B2 * | 5/2018 | Hanks | F28D 1/0461 | |
| 2002/0076669 A1 * | 6/2002 | Riepenhoff | F23M 9/06 | 431/354 |
| 2003/0178472 A1 * | 9/2003 | Gendron | B23K 33/00 | 228/165 |
| 2009/0045621 A1 * | 2/2009 | Heraud | F16L 13/103 | 285/286.2 |
| 2010/0139094 A1 * | 6/2010 | Branyon | B21D 53/08 | 29/890.043 |
| 2011/0174290 A1 * | 7/2011 | Schneberger | F24H 3/087 | 126/110 R |
| 2012/0055014 A1 * | 3/2012 | Branyon | B21D 53/08 | 29/726.5 |
| 2012/0267559 A1 * | 10/2012 | Moretz | F16J 15/061 | 251/316 |
| 2014/0231056 A1 * | 8/2014 | Covington | F28F 1/22 | 165/168 |

(56) References Cited

U.S. PATENT DOCUMENTS

2015/0369495 A1* 12/2015 Maricic ................ F23D 14/045
                                                    126/116 A
2016/0377203 A1* 12/2016 Norman ................. F16L 13/14
                                                    285/382.7
2018/0202652 A1*  7/2018 Batson .................... F23D 14/02

* cited by examiner

GAS-FIRED TUBE SWAGED JOINT

CROSS-REFERENCE TO RELATED APPLICATIONS

The present application claims priority under 35 U.S.C. 119(e) to U.S. Provisional Patent Application No. 62/020,137 filed on Jul. 2, 2014 by Bradbury, et al., and entitled "Gas-Fired Tube Swaged Joint," the disclosure of which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Heating, ventilation, and/or air conditioning (HVAC) systems may generally be used in residential and/or commercial areas for heating and/or cooling to create comfortable temperatures inside those areas. HVAC systems may generally be capable of cooling a comfort zone by operating in a cooling mode for transferring heat from a comfort zone to an ambient zone using a refrigeration cycle and also generally capable of reversing the direction of refrigerant flow through the components of the HVAC system so that heat is transferred from the ambient zone to the comfort zone, thereby heating the comfort zone. To manage the flow of air between the comfort zone and ambient zone, HVAC systems may include a gas-fired heat exchange system that operates in the regulation, circulation, and conditioning of air.

SUMMARY

In an embodiment, a heat exchange (HE) system for heating, ventilation, and air conditioning (HVAC) comprises a burner box, a hot collector box, and a heat exchanger tube. The heat exchanger tube may be disposed between, and in fluid communication with, the burner box and the hot collector box. The heat exchanger tube is rigidly connected to at least one of the hot collector box or burner box by a swaged joint. The HE system may further comprise a circulation air blower, an air and fuel mixing unit, and a burner. The air and fuel mixing unit and the burner may be configured to be in fluid communication with the burner box. The burner may be a gas-fired burner that is configured to be in fluid communication with a gas flow that is an at least partially combined mixture of air and fuel.

In an embodiment, a swaged joint comprises a constriction section and an expansion section. The constriction section may comprise a lip flange of a panel with a defined opening. The constriction section may also comprise an end flare of a heat exchanger tube. The heat exchanger tube and opening defined by the panel may be axially aligned with a centerline extending longitudinally. The constriction section may at least partially define a convex shape along the inner surface with respect to the centerline. The expansion section of the swaged joint may comprise a shoulder, wherein at least a portion of the shoulder defines a concave shape along the inner surface with respect to the centerline. The expansion section may be adjacent to the constriction section and may be between the constriction section and an intermediate section of the heat exchanger tube. The swaged joint has an inner surface that is configured to be in fluid communication with a gas flow. At least a portion of the heat exchanger tube is radially swaged with at least a portion of the lip flange.

In an embodiment, a method of sealing a heat exchanger tube with a panel of a HE system is disclosed. The method comprises forming a lip flange from the panel having a defined opening, and surrounding at least a portion of an end of the heat exchanger tube with at least a portion of the lip flange. The heat exchanger tube at least partially extends longitudinally along a centerline and comprises an intermediate section that is adjacent to a swaged joint. The method further comprises forming an end flare from the end of the heat exchanger tube such that the end flare is transverse to the centerline, and the end flare is at least partially flush with a side of the panel. The method comprises the step of swaging the heat exchanger tube radially with the lip flange to form the swaged joint. The swaged joint is configured to maintain a seal throughout cyclical thermal heating and cooling.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

Figure 1:
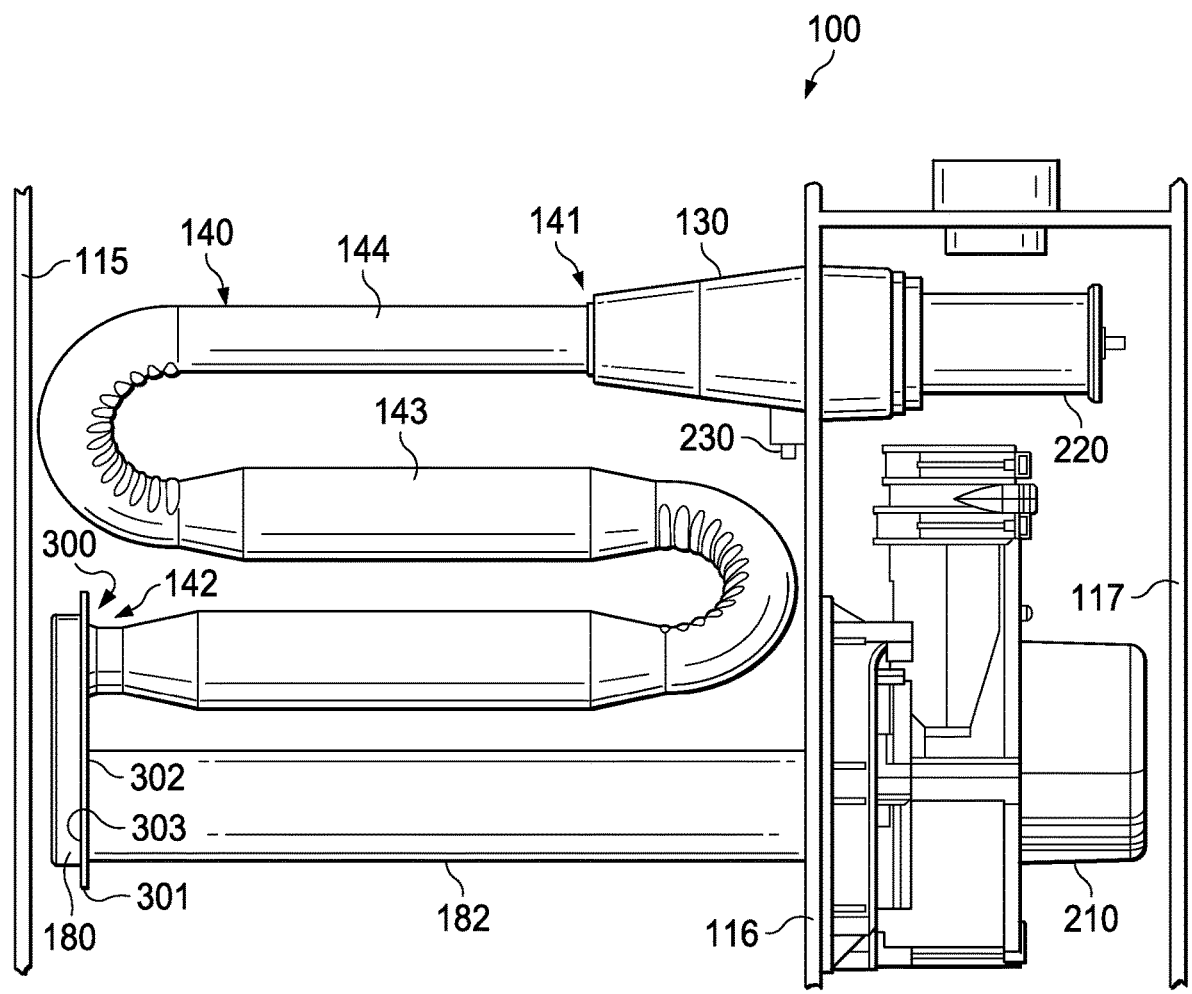
FIG. 1 is an orthogonal simplified view of a heat exchange system according to an embodiment of the disclosure.

In the drawings and description that follow, like parts are typically marked throughout the specification and drawings with the same reference numerals, respectively. In addition, similar reference numerals may refer to similar components in different embodiments disclosed herein. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is not intended to limit the invention to the embodiments illustrated and described herein. It is to be fully recognized that the different teachings of the embodiments discussed herein may be employed separately or in any suitable combination to produce desired results.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Reference to in or out will be made for purposes of description with "in," "inner," or "inward" meaning toward the center, centerline, or central axis of the swaged joint, and with "out," "outer," or "outward" meaning toward the tubular and/or wall of the swaged joint. Reference to "longitudinal," "longitudinally," or "axially" means a direction substantially aligned with the main axis of the swaged joint and/or swaged joint tubular. Reference to "radial" or "radially" means a direction substantially aligned with a line between the main axis of the swaged joint and the swaged joint wall that is substantially normal to the main axis of the swaged joint and/or swaged joint tubular, though the radial direction does not have to pass through the central axis of the swaged joint and/or swaged joint tubular. The various characteristics mentioned above, as well as other features and characteristics described in more detail below, will be readily apparent to those skilled in the art with the aid of this disclosure upon reading the following detailed description of the embodiments, and by referring to the accompanying drawings.

A heat exchanger (HE) system may operate in the regulation, circulation, and conditioning of air. Heat exchanger systems are used in commercial and residential environments for heating a defined environment, including space heating for air conditioning interior spaces. However, a heat exchanger unit may include gas-fired furnaces that can generate high temperatures leading to the formation and emission of various oxides of nitrogen (NOx). NOx is a term used herein to describe the various oxides of nitrogen, for example NO and NO2. Levels of gaseous emissions (e.g. NOx, CO, and/or other volatile organic compound emissions) from gas-fired furnaces may be attributable to less than optimal air-fuel mixtures and/or combustion temperatures. It is understood that flame shaping, flame fitting, and/or fluid shaping of a gas flow can affect temperatures and/or emission levels (e.g., emissions escaping through joint connections), and conventional methods of flame shaping, flame fitting, and/or fluid shaping include utilizing additional parts—such as a gasket, sealant, and/or sleeve—apart from a heat exchanger tube and panel. Additionally, gaseous emissions (e.g. NOx emissions) are known to have less than desirable environmental effects, such as NOx reacting to form nitric acid that may lead to respiratory diseases if inhaled by individuals. Thus, regulatory agencies may impose standards for allowable levels of gaseous emissions in a given environment.

Heat exchanger systems typically include at least one heat exchanger tube that is mechanically fastened and sealed to a surface, thus forming a joint section. During cyclic use of the heat exchanger system—that is cyclical ignition of burners in fluid communication with heat exchanger tubes—there is expansion and contraction of the joint in the joint section due to cyclic heating and cooling. The traditional configuration of the joint section is such that cyclical expansion and contraction of the joint may cause the joint to loosen and allow for passage of fluids through the joint, such as causing the joint to loosen and begin leaking conditioned air into portions of a heat exchanger system with fully negative heat exchangers. Additionally, it may be desirable to meet and/or exceed regulatory standards, such as lowering the NOx production during cyclical use to below a predefined threshold, for instance less than about 14 nanograms NOx emitted per joule (ng/J) of heat/energy transferred to a conditioned space. It is understood that "emission" thresholds, limits, and/or standards may refer to an amount of gaseous emissions that may be permitted and/or pre-determined as allowable. In some circumstances, passage of gasses from and/or through a joint may hinder the ability of a heat exchanger unit that is gas-fired to conform with emission goals and/or regulatory standards. Increasing the amount of component parts in-line (in fluid communication) with a heat exchanger tube increases the frequency of joints and thus adds to the likelihood of potential leakage from each joint. Conventional methods attempting to mitigate leakage from a tube joint include using furnace cements, chemical sealants, or welding; however, such methods are time-consuming, not easily repeatable, and costly; while also limiting product life expectancy due to failure from cyclical heating and cooling.

Accordingly, a swaged joint is provided to reduce or substantially prevent the leakage of gaseous emissions or conditioned air at a rigid connection where there is an associated expansion and contraction of materials due to a cyclic operation of heating and cooling, such as may be experienced by a heat exchanger tube. For example, a swaged joint may be radially swaged from at least a portion of a lip flange of a panel and at least a portion of a heat exchanger tube. Embodiments where a heat exchanger tube is a gas-fired tube may comprise a fluid contour section that may be configured to lower the joint temperature by shaping the fluid gas flow that is in fluid communication with at least the heat exchanger tube. Because the swaged joint may be radially swaged and/or be configured with an interference fit, mitigation of leakage may be achieved while also maintaining a seal through cyclical heating and cooling. Furthermore, some embodiments of a swaged joint may comprise a fluid contour section that may be configured at least for fluid shaping while being integrally formed with a portion of the heat exchanger tube.

Turning now to FIG. 1, an orthogonal simplified view of a heat exchange (HE) system 100 is shown according to an embodiment of the disclosure. It is understood that an HVAC system may comprise an indoor unit, an outdoor unit, and a system controller. One embodiment of an indoor unit may be an HE system 100. As discussed herein, an HVAC system, HE system, and/or a component therein, may be referred to with the prefix of being "gas-fired", where the "gas-fired" component and/or system is configured to be in fluid communication with a gas flow for thermodynamic heat transfer in an HVAC system, where the gas-flow comprises products of a combustion reaction from a burner for at least partially mixed or fully mixed air and fuel. Exemplary burners may include, but are not limited to, any of a cavity burner, in-shot burner, flat burner, porous ceramic burner, convective burners, infrared burners, or the like. Referring to FIG. 1, in some embodiments, the HE system 100 may comprise a plurality of partition panels, such as a first side panel 115, a second side panel 116, and a third side panel 117. The first 115, second 116, and third 117 side panels may be disposed in a configuration such that fluids (e.g. air) that contact a component of HE system 100 (e.g. fluid passing over the exterior of a heat exchanger tube 140 for thermodynamic heat transfer) are kept segregated and/or confined to route the circulating fluid.

The HE system 100 may further comprise an air and fuel (air/fuel) mixing unit 220, a burner box 130, an igniter 230, at least one burner, a heat exchanger tube 140, a hot collector box 180, and a draft inducer unit 210. The air/fuel mixing unit 220 may include an air/fuel mixing box and an air/fuel mixing baffle. In some embodiments, the air/fuel mixing baffle may be within the air/fuel mixing box and/or connected to a portion of a partition panel, such as above an opening that is in fluid communication with the heat exchanger tube 140. The air/fuel mixing box may be mounted to a partition panel (e.g. partition panel 116) such that a cavity is created within the air/fuel mixing box and around the air/fuel mixing baffle and/or an opening of the partition panel that is in fluid communication with the heat exchanger tube 140. The air/fuel mixing unit 220 may be configured for the introduction of fuel and air to allow at least partial mixing of fuel and air before a combustion reaction process. The air/fuel mixing baffle may be configured to aid in the mixing of air and fuel in the air/fuel mixing box by altering the direction of air and fuel flow through the air/fuel mixing box. In some embodiments, the air/fuel mixing unit 220 may be configured to combine a received predefined volumetric flow rate of air and a predefined volumetric flow rate of fuel for use in a heat exchange system. It is understood that while some embodiments may be configured to use air and fuel for combustion in a heat exchange system and/or method, alternate embodiments may use oxidants such as oxygen for use in a combustion process. The mixing of the air and fuel may also be aided by a mixing device that is configured to encourage and/or develop homogeneous mixing of the fuel and air for a gas flow in fluid communication with a burner, such as a cavity burner, configured to direct combustion of the at least partially premixed gas flow. In some embodiments, a burner that is configured to operatively engage with an at least partially premixed gas flow may be referred to as a partially premixed burner and/or a fully premixed burner.

In some embodiments, the air/fuel mixing unit 220 may be configured to receive fuel via a gas supply valve. For example, the fuel may be natural gas available from the gas supply valve attached and operatively engaged with the air/fuel mixing unit 220. The gas supply valve may be configured to be adjusted, such as electrically or pneumatically, so as to obtain a desired and/or predefined air-to-fuel ratio, thereby controlling an increase in efficiency and lower NOx emissions. The gas supply valve may be configured for staged operation and/or modulation type operation, and may be operatively connected to a control component. For example, staged operation may comprise two flame settings, whereas modulation type operation may be incrementally adjustable over a large range of outputs, such as from 40% to 100% output capacity. The air/fuel mixing unit 220 and/or a partition panel may be mounted and/or connected to the burner box 130. In some embodiments, the burner box 130 may be rigidly coupled to second side panel 116 and disposed around an opening of the second side panel 116. The burner box 130 may include at least one burner and at least one igniter 230, where the at least one burner and/or igniter 230 may be at least partially disposed in the burner box 130 cavity and/or at least one heat exchanger tube 140, such that the at least one burner is within a combustion flow path that a gas flow may follow.

It is understood that a gas flow may comprise differing characteristics when traveling along the combustion flow path. For example, the gas flow may initially take the form of air and fuel that is at least partially mixed and/or uncombusted (i.e., not yet ignited or undergone a combustion reaction). As the gas flow travels to at least one of the burner box 130 and/or the heat exchanger tube 140 that is in fluid communication with the gas flow, an igniter and/or burner may initiate a combustion reaction. In an embodiment, an igniter 230 may be mounted to and/or in fluid communication with the burner box 130 and/or may be positioned at an opening of at least one burner (e.g., of one burner or an opening to multiple burners). The igniter 230 may be configured to induce a combustion reaction by igniting the air/fuel gas flow mixture passing in and/or by at least one of the burners. In an embodiment with a plurality of burners, certain burners that are not directly ignited may be ignited by a flame-carry-over path that may connect each of the unignited burners to a burner ignited via igniter 230. In an embodiment, the igniter 230 may comprise any of a pilot light, a piezoelectric device, and/or a hot surface igniter. In some embodiments, the igniter 230 may be controlled by a control system and/or be capable of manual ignition. The igniter 230 may also comprise a flame sensor that may include any of a thermocouple, a flame rectification device, and/or another suitable safety device.

In some embodiments, combustion may occur at least partially within an interior space of a burner so that heat is generated and forced out of the open end of the burner and into the burner box 130 cavity and/or into the heat exchanger tube 140. In an embodiment, the combustion may occur generally within a space bound by the cylindrical wall of the burner. In alternate embodiments, combustion may occur within the interior space and/or outside the interior space of the burner, such as in a space generally associated with the open end of the burner. Other embodiments may have a burner disposed with the opening adjacent to the air/fuel mixing unit, and the flame situated on the exterior surface of the burner. In some embodiments, a gas flow that has at least partially undergone a combustion reaction may be referred to as a hot flue gas flow or hot flue gasses. The hot flue gasses may be a result of the combustion of the gas flow comprising the air/fuel mixture and may contain levels of certain emissions, such as $NO_X$.

In an embodiment of the HE system 100, the fluid temperature in a fluid gas flow may be controlled through the use of a burner or other burner technologies. Some embodiment of an HE system 100 may comprise a swaged joint—such as embodiments discussed in FIGS. 3-7 below—comprising a flow contour section that is configured to control the swaged joint temperature (i.e., the relative temperature of the swaged joint during fluid communication with a gas flow) at least by directing and/or shaping at least a portion of the fluid away from the swaged joint structure (e.g. an inner surface of the swaged joint). Combustion within a cavity burner, a flat burner, or other premixed or partially premixed burner technologies may occur more rapidly and transfer heat more rapidly thus reducing the time flue products are at elevated temperatures in the presence of oxygen and may have a much smaller flame and/or fluid front area thereby reducing the level of emissions (e.g., $NO_X$) generated and thereafter present in the flue gases. Similarly, an embodiment of a swaged joint comprising a flow contour section may be configured to shape a fluid exiting from a burner, thus controlling the fluid shape and/or lowering the temperature of the swaged joint. For example, a swaged joint may comprise a fluid contour section that is configured to at least one of control fluid gas flow along a flow path and/or shape a fluid gas flow away from the swaged joint thereby reducing the swaged joint temperature—such as portions of an inner surface of the swaged joint may not have uniform communication with the fluid gas flow, thus affecting heat transfer from the fluid gas flow to the swaged joint, which in turn may control the swaged joint temperature and/or control direct impingement of the fluid on the swaged joint to control the differential temperatures experienced during cyclical heating and cooling. Embodiments of a swaged joint that is configured to control the swaged joint temperature, and/or experienced temperature differentials of the swaged joint, may control ingression of conditioned air into the heat exchanger tube 140, such as embodiments disclosed in FIG. 2. Embodiments of a swaged joint of a swaged joint section may be downstream and/or upstream of a location of an intermediate section 144 of heat exchanger tube 140, where the intermediate section 144 is configured for heat transfer from a fluid gas flow (e.g., hot flue gases) to a conditioned environment and/or conditioned air flow, such as embodiments disclosed in FIG. 2.

In some embodiments, a gas flow may follow a combustion flow path that may be in a direction beginning at the air/fuel mixing unit 220 and ending at the draft inducer unit 210. For example, the combustion flow path may follow from the air/fuel mixing unit 220, through an opening of the second side panel 116, through burner box 130, past a burner, into a heat exchanger tube 140 first end 141 and out heat exchanger tube 140 second end 142, past a swaged joint section 300, through hot collector box 180, through flue vent 182, and exiting past draft inducer unit 210 towards a designated venting environment. It is understood that there may be more or less components of the HE system 100 in fluid communication with the combustion flow path.

In an embodiment, combustion fluids (e.g, air and/or gas introduced for the combustion process) may be introduced into the HE system 100 by operating in an induced draft mode, by pulling air through the system, or by operating in a forced draft mode by pushing air and/or gas flow through the system. Some embodiments of induced draft mode may be accomplished by using a draft inducer unit 210 that may comprise a blower or fan which is in fluid communication with the combustion flow path and is down-stream of the heat exchanger tube 140. The draft inducer unit 210 may be attached to the HE system 100 and may pull and/or extract combustion flow out from the heat exchanger tube 140 by creating a relatively lower pressure at one end of the combustion flow path. Embodiments using a forced draft mode may be accomplished by placing a blower or fan at the air/fuel mixing unit 220 and forcing gas flow into through air/fuel mixing unit 220 and/or along the combustion flow path. In some embodiments, a control system may be configured to control the fan or blower to a predefined speed to achieve adequate gas flow for a desired firing rate through at least one burner. Adjusting the fan speed of the draft blower may affect the air/fuel mixture of the gas flow, thereby changing the characteristics of combustion in the burners.

The heat exchanger tube 140 may be constructed of a cylindrical piece of metal having a slightly larger inner diameter than an outer diameter of the burner, if the burner is a cavity burner. The cavity burner may be perforated to allow the gas flow air/fuel mixture through the walls of the cavity burner. For example, a cavity burner may comprise a plurality of perforations over a predefined portion of the cylindrical wall and end wall of the cavity burner. In some embodiments, a cavity burner may be substantially coaxially received within the heat exchanger tube 140. In some embodiments, a burner may be configured to comprise a flame that is counter-flow to the direction of the combustion flow path in a HE system 100, which may result in some and/or substantially all of the air/fuel gas flow mixture passing through a plurality of perforations in the burners. In an embodiment that positions a cavity burner at least partially within the heat exchanger tube 140, the cavity burner may be within a combustion flow path such that substantially all of the gas flow for combustion passes through the cavity burner. A burner may be a cavity burner that is gas-fired and is configured to operatively engage with and/or be in fluid communication with an air/fuel mixture gas flow.

In some embodiments, the cavity burner may comprise a substantially cylindrical shape, be open on one end and closed on the opposite end. The open end of the cavity burner may be positioned proximate and/or within an input opening on an end of the heat exchanger tube 140 (e.g. heat exchanger tube first end 141). Substantially enclosing a cavity burner within an opening of the heat exchanger tube 140 and/or substantially containing combustion within a cavity burner may reduce the amount of thermal radiation emitted to parts of the HE system 100 other than the heat exchanger tube 140. Each of a plurality of cavity burners may have an associated heat exchanger tube 140 for venting hot flue gasses such that the heat exchanger tube 140 is in the combustion flow path of the associated cavity burner. In some embodiments, a heat exchanger tube 140 may be a gas-fired tube, where the gas-fired tube 140 is configured to be in fluid communication with a gas flow for thermodynamic heat transfer, where the gas-flow comprises products of a combustion reaction from a cavity or other type of burner for at least partially mixed or fully mixed air and fuel. In some embodiments, a cavity or other type of burner may be configured to operate in a partially premixed and/or fully premixed air/fuel mixture gas flow.

A heat exchanger tube 140 may comprise a first end 141 and second end 142, where the portion therebetween may have sections that are substantially tubular with a substantially uniform wall. The diameter of a heat exchanger tube 140 may vary over the length the heat exchanger tube 140 extends, such as between first end 141 and second end 142. In an embodiment, the portion of the heat exchanger tube 140 between the first end 141 and second end 142 may be referred to as an intermediate section 144, where the intermediate section 144 may be adjacent to and separate from a swaged joint section, such as swaged joint section 300. The intermediate section 144 may comprise an outer diameter measured from a centerline. In some embodiments, the intermediate section 144 may comprise a plurality of varying cross-sectional configurations between the first end 141 and second end 142 that may improve heat transfer from the heat exchanger tube 140. For example, the heat exchanger tube 140 may comprise a generally uniform circular tube cross section and then transition to a flattened section 143 of the heat exchanger tube 140 that may be configured to streamline the fluid dynamic flow of fluids (e.g. air) passing over the outer surface of the heat exchanger tube 140. The flattened section 143 may also be configured to increase the contact area of a fluid passing over the outer surface of the heat exchanger tube 140, which thus may be configured to increase thermodynamic heat transfer from a gas flow inside the heat exchanger tube 140 to the fluid passing over the outer surface which may travel to a conditioned environment. In alternative embodiments, a heat exchanger tube 140 may include any of a clamshell, tubular, drum, and/or shell and tube type heat exchanger portions that are configured for fluid communication with the hot flue gasses. In some embodiments, a heat exchanger tube 140 may be configured with a plurality of bends (e.g. directional changes that may be than 90 degrees) and/or a plurality of flattened sections 143. Alternative embodiments of a heat exchanger tube 140 may include having a configuration without any flattened sections 143 and/or without bends between first end 141 and second end 142.

The heat exchanger tube 140 may be rigidly coupled and/or connected to a component of the HE system 100, such as any of burner box 130, a hot collector box 180, and/or a panel. It is understood that a panel may be a stand-alone structure (e.g. partition panel 301), and/or be part of a component (e.g. a panel of any one of a component of an HVAC system, an HE system, the burner box 130, and/or hot collector box 180). In an embodiment, the heat exchanger tube 140 may be connected and/or in fluid communication with any of a partition panel 301, a hot collector box 180 and/or a flue vent 182. Each of the partition panel 301, hot collector box 180 and/or flue vent 182 may be rigidly connected with one another and/or may be downstream of the heat exchanger tube 140 (i.e. along the combustion flow path). In an embodiment of an HE system 100 comprising a panel, the panel may be disposed transverse to the combustion flow path and/or a centerline. The panel may comprise a substantially uniform thickness. For example, partition panel 301 may include a measured thickness between a partition panel 301 first side surface 302 and a second side surface 303.

Figure 2:
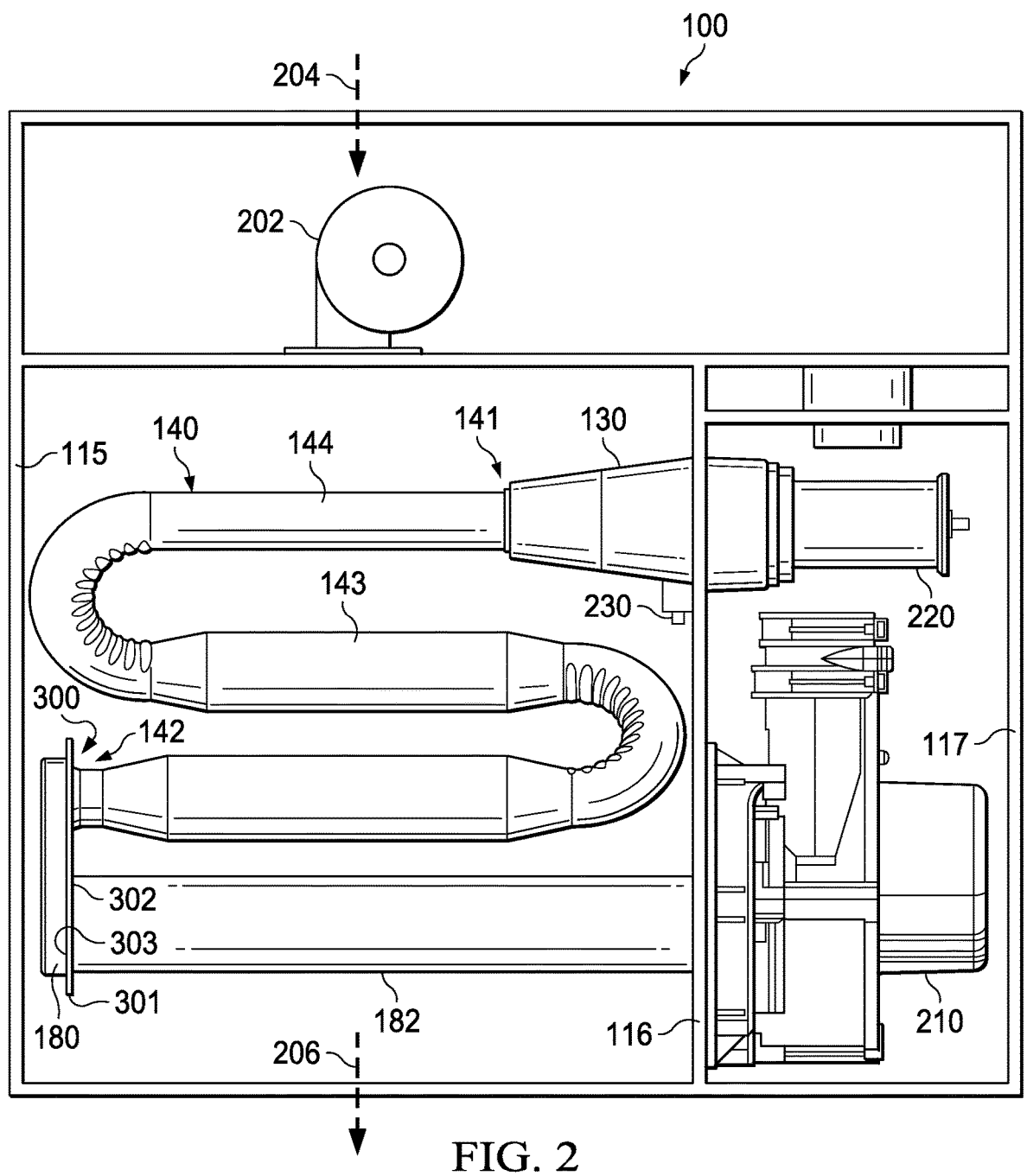
FIG. 2 is an orthogonal simplified view of a heat exchange system according to an embodiment of the disclosure.

In some embodiments, a portion of the burner box 130 and/or hot collector box 180 may comprise a panel, where a swaged joint—including but not limited to the embodiments of FIGS. 3-7 discussed herein—rigidly connects at least a portion of the panel with at least a portion of the heat exchanger tube 140. A panel (such as, but not limited to, any one of a partition panel 301, a hot collector box 180 panel, a burner box 130 panel) and/or a heat exchanger tube 140 may comprise materials, such as sheet metal, that is configured to form a swaged joint. It is understood that a swaged joint may be constructed of any suitable materials for embodiments disclosed herein. In some embodiments, a swaged joint may be configured to form a seal without the use of a gasket, bolts, nuts, sealants, adhesives, and/or wrappings. As shown in FIGS. 1 and 2, embodiments of a swaged joint may be formed from a portion of a partition panel 301 and a portion of a heat exchanger tube 140, although it will be appreciated by one of ordinary skill in the art that the various locations/portions connecting components of a HE system 100 may use a swaged joint that may be formed from and/or contained with separate components that are coupled together.

It is understood that air/fuel mixture ratios (i.e. the relative proportion of air and fuel that may be associated with a combustion reaction) may be affected by the amount of respective air/fuel added or lost from initial introduction into the HE system 100. For example, a predefined volume/volumetric flow rate of air and fuel may be introduced into air/fuel mixing unit 220, which may allow for an initial air/fuel mixture ratio. Yet as the air/fuel mixture gas flow travels along the combustion path, additional air may be introduced to the gas flow through connections (e.g. joints that may couple and/or connect components of HE system 100 to one another).

In some embodiments, rigid connections may be required to provide a seal that is configured to meet predefined tolerances for air/fuel mixture ratios, and/or emission limits from an HE system 100 (e.g., a predefined amount and/or rate of gaseous fluid leaking through a swaged joint). For example, a swaged joint section 300 (or any of the embodiments described herein) may comprise a swaged joint that may be configured to form a seal that has and/or conforms to and/or maintains a predefined gas flow emission limit (e.g., a predefined amount and/or rate of gaseous fluid leaking through a swaged joint) and/or air/fuel mixture ratio that conforms to a predefined amount/measurement. In some embodiments, an emission limit may be in terms of gaseous emissions—such as, the sum of oxides of nitrogen in flue gasses that may be released from gas flow to an external environment, or ingress of conditioned air into a heat exchanger tube 140, which may be across the seal and/or through a swaged joint 145, 645. In some embodiments, an emission limit may be defined in terms of allowing release of no more than a predefined amount (e.g. any of about 3, 14, and/or 40 nanograms) of a predefined substance (e.g. oxides of nitrogen, carbon) per joule (e.g., per joule of heat/energy transferred/delivered to a heated/conditioned space). For example, two components of the HE system 100 may connect with each other at a swaged joint section (e.g. heat exchanger tube 140 rigidly coupled at swaged joint section 300 that comprises a swaged joint 145, where the swaged joint is radially swaged with respect to a centerline). In some embodiment, a swaged joint section (e.g. swaged joint section 300) comprises a swaged joint (e.g. embodiments discussed in FIGS. 3-7, such as any of swaged joint 145, 645) that may be configured to form a seal that may conform to predefined tolerances (e.g. interference fit of no more than 0.005 inches per inch diameter) and/or specifications. An interference fit of a swaged joint (145, 645) may be between at least a portion of a panel (301, 601) and heat exchanger tube 140. A swaged joint (such as any of 145, 645) may be axially swaged with respect to a centerline 150 of the heat exchanger tube 140 such that a seal is formed. In some embodiments, an interference fit may be measured in inches per diameter and include less than about any of: 0.010, 0.009, 0.008, 0.007, 0.006, 0.005, or any number therebetween. The interference fit advantageously limits the amount of gas leaking from the joint and anything larger than 0.010 may not conform to emissions standards or other regulatory requirements. A seal formed by a swaged joint 145, 645 may be configured to be a hermetic seal or substantially hermetic seal. The swaged joint may be configured to maintain and/or conform to emission limits and/or maintain air/fuel mixture ratios while exposed to a cyclical heating and/or cooling environment. Although the swaged joint section 300 is shown proximate to the second end 142 and partition panel 301, it is understood that a swaged joint section (such as embodiments of FIGS. 6 and 7) may be incorporated into connections and/or couplings at alternate locations within an HVAC system and/or a HE system 100, such as between heat exchanger tube 140 first end 141 and burner box 130. Alternate embodiments of a swaged joint section (e.g. embodiments disclosed in FIGS. 6-7) may be comprised in a variety of environments and/or locations and are not to be limited to the location shown in FIG. 1.

As shown in FIG. 2, the HE system 100 may further comprise a circulation air blower 202. FIG. 2 includes references to embodiments of components, sections, and areas that are previously disclosed in FIG. 1, and for brevity, like numerals may be assumed to be the same or substantially similar. The circulation air blower 202 may be configured to selectively force fluid (e.g. air) into contact with the heat exchanger tube 140 and/or a variety of heat exchangers used in conjunction with heat exchanger tube 140. In an embodiment, the circulation air blower 202 may be configured to receive an incoming airflow 204 and pass the incoming airflow 204 into contact with the heat exchanger tube 140. In response to the incoming airflow 204 contacting the heat exchanger tube 140, heat may be transferred from the gas flow (e.g. hot flue gases) inside the heat exchanger tube 140 to the air, thereby heating the incoming airflow 204 and/or otherwise reducing a temperature of the hot flue gases. Exiting airflow 206 may be and airflow with a temperature differential from the incoming airflow 204, where the exiting airflow 206 is to be distributed to a designated area for conditioned heated air—that is air at a higher relative temperature than the air of the incoming airflow 204.

The circulation air blower 202 may serve to create the flow of the fluid that contacts the heat exchanger tube 140. In general, the circulation air blower 202 may drive an air flow over the exterior of the heat exchanger tube/gas fired tube 140 as well as driving a ventilation system to circulate the exiting airflow 206 within a designated environment receiving conditioned air. While described as a blower, various types of fans and blowers can be used as the circulation air blower 202. In an embodiment, the circulation air blower 202 may be a centrifugal blower comprising a blower housing, a blower impeller at least partially disposed within the blower housing, and a blower motor configured to selectively rotate the blower impeller. In other embodiments, the circulation air blower 202 may comprise a mixed-flow fan and/or any other suitable type of fan. The circulation air blower 202 may be configured as a modulating and/or variable speed fan capable of being operated at many speeds over one or more ranges of speeds. In other embodiments, the circulation air blower 202 may be configured as a multiple speed fan capable of being operated at a plurality of operating speeds by selectively electrically powering different ones of multiple electromagnetic windings of a motor of the circulation air blower 202. In yet other embodiments, the circulation air blower 202 may be a single speed fan.

In some embodiments, an HE system 100 may comprise a control system that comprises a system controller. The system controller may selectively communicate with a plurality of controllers, units, and/or other components of an HVAC system. In some embodiments, the system controller may be configured for selective bidirectional communication over a communication bus. In some embodiments, portions of the communication bus may comprise a three-wire connection suitable for communicating messages between the system controller and one or more of the HVAC system components configured for interfacing with the communication bus. Still further, the system controller may be configured to selectively communicate with any of an HVAC system and/or the HE system 100 components and/or any other device configured for network communication via a communication network. In some embodiments, the communication network may comprise a telephone network and/or radio access network, and the other device may comprise a communication device, such as a telephone. In some embodiments, the communication network may comprise the Internet, and the other device may comprise a smartphone and/or other Internet-enabled mobile telecommunication device. In other embodiments, the communication network may be communicatively coupled with a computer system that comprises any of a processor, a non-transitory memory, and a transceiver. Some embodiments of the system controller may comprise a computer system.

Figure 3:
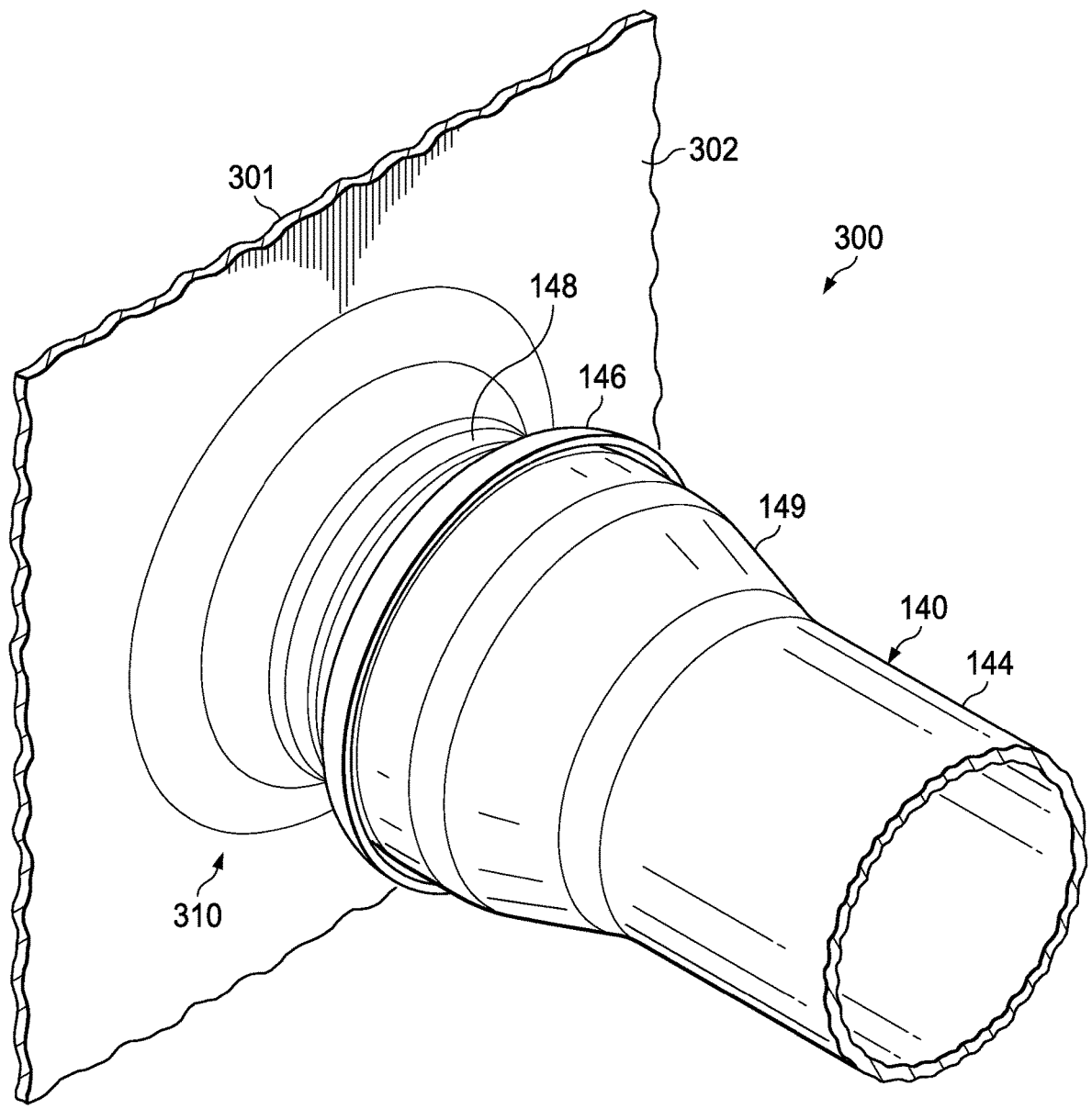
FIG. 3 is an orthogonal view of an exemplary swaged joint section according to an embodiment of the disclosure.
Figure 4:
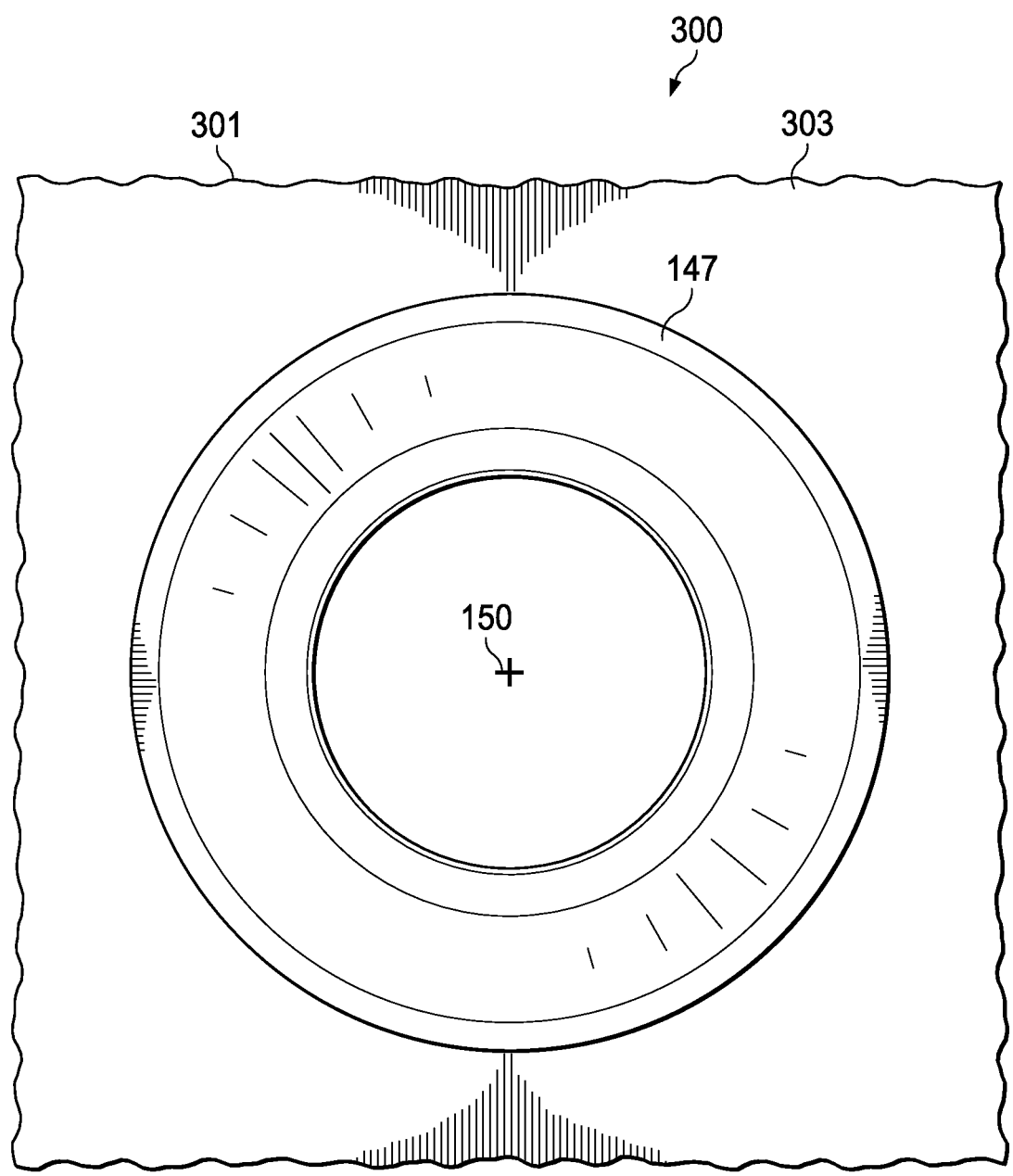
FIG. 4 is an orthogonal view of an exemplary swaged joint section according to an embodiment of the disclosure.
Figure 5:
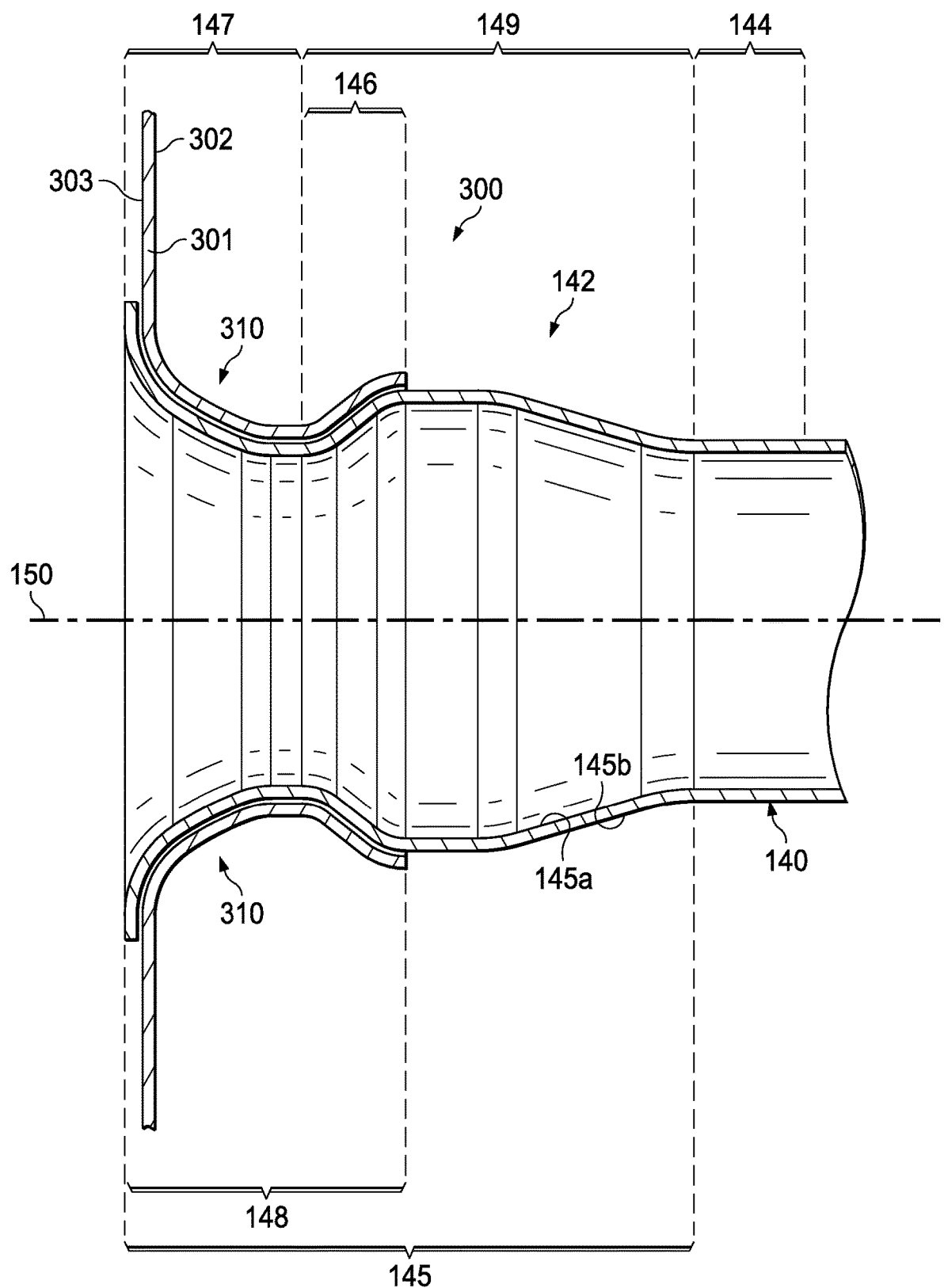
FIG. 5 is a cross-sectional view of a swaged joint section according to an embodiment of the disclosure.

As shown in FIGS. 3-5, swaged joint section 300 may comprise at least a portion of heat exchanger tube 140 and at least a portion of partition panel 301. FIGS. 3-5 includes references to embodiments of components, sections, and areas that are previously disclosed herein, and for brevity, like numerals may be assumed to be the same or substantially similar. In some embodiments, the heat exchanger tube 140 is a gas-fired tube, where the gas-fired tube is configured to be in fluid communication with a gas flow for thermodynamic heat transfer in an HVAC system, where the gas-flow comprises products of a combustion reaction from a burner for at least partially mixed or fully mixed air and fuel. In some embodiments, the gas-flow may be at least partially mixed or fully mixed air and fuel. As shown in FIG. 3, partition panel 301 has side surfaces (i.e., first side 302 and second side 303) that are transverse to a centerline 150. In some embodiments, the centerline 150 is a central axis of a swaged joint that extends longitudinally. In some embodiments, any of the heat exchanger tube 140 and/or opening defined by the partition panel 301 are axially aligned with the centerline 150. As shown in the embodiment of FIG. 4, the opening defined by partition panel 301 may be circular, where the centerline 150 is transverse to the opening. In an embodiment, a swaged joint (e.g. 145) comprises an end flare 147 that is formed from a portion of heat exchanger tube 140. At least a portion of the end flare 147 may be flush and/or at least partially flush with a side of a panel—such as end flare 147 being at least partially flush with at least a portion of second side 303 of partition panel 301. In some embodiments, at least a section of a swaged joint (e.g., a constriction section 148 comprising an end flare 147) may be configured to define an interference fit comprising a predefined value, such as less than 0.05 inches per inch of diameter of the swaged joint (e.g., 145, 645) measured relative to the centerline 150. In some embodiments, a partition panel 301 may comprise a lip flange, such as 310. A swaged joint, (e.g., any of 145, 645), may comprise at least a portion of a lip flange (e.g., 310, 610). The swaged joint 145 may be configured such that at least a portion of the lip flange 310 prevents relative movement of the heat exchanger tube 140 and partition panel 301 relative to centerline 150 and/or a combustion flow path as disclosed above.

The intermediate section 144 of a heat exchanger tube 140 may comprise at least a portion including a circular and/or substantially circular tube that may be substantially uniform (e.g., when viewed in a cross-sectional that is transverse to the centerline 150). In some embodiments, the intermediate section 144 may transition along the length of heat exchanger tube 140 from an end section and/or towards an end section of the heat exchanger tube 140, such as first end 141 and/or second end 142. The intermediate section 144 may also be configured for thermodynamic heat transfer within HE system 100. In an embodiment, the intermediate section 144 transitions to a swaged joint section, such as the embodiments shown in 300, 600, 700. In an embodiment, the swaged joint section 300 may comprise a swaged joint 145 that comprises a constriction section 148 and a shoulder 146. The swaged joint 145 may further comprise an expansion section 149. In some embodiments, at least a portion of the constriction section 148 and/or expansion section 149 may be configured to form a seal that yields and/or controls passage of a predefined amount/percentage of combustion reactions, premixed fuel, and/or air across the seal and/or through the swaged joint 145, such as forming a seal that yields no more than a defined amount of a predefined substance across/passed through the seal (e.g., no more than 14 ng of oxides of nitrogen per joule).

Referring to FIG. 5, a cross-section view of a swaged joint section 300 is disclosed according to an embodiment. The swaged joint section 300 comprises a swaged joint 145 that is adjacent to an intermediate section 144 of heat exchanger tube 140. Some embodiments of the swaged joint 145 do not include the intermediate section 144. The swaged joint section 300 may reference centerline 150 that may bisect swaged joint 145. In an embodiment, partition panel 301 comprises a first side 302, second side 303, and a lip flange 310. In an embodiment, the swaged joint 145 rigidly couples at least a portion of partition panel 301 and at least a portion of the second end 142 of heat exchanger tube 140. Partition panel 301 may define an opening that is coaxially aligned along the centerline 150. A swaged joint 145 may comprise at least a portion of the heat exchanger tube 140 that may be any of axially swaged and/or radially swaged with at least a portion of the lip flange 310. In some embodiments, the swaged joint section 300, comprising the swaged joint 145, rigidly couples the heat exchanger tube 140 that is a gas-fired tube. It is understood that alternate embodiments of a swaged joint section (such as embodiments 600, 700 disclosed in FIGS. 6 and 7) may comprise a swaged joint that couples a panel of a component of an HVAC system and/or HE system 100 with a portion of a heat exchanger tube 140.

A swaged joint 145 has an inner surface 145a and an outer surface 145b with respect to centerline 150, where the inner surface 145a may be configured to be in fluid communication with a gas flow. It is understood that the inner surface 145a and outer surface 145b extend longitudinally with the centerline 150 according to the various embodiments of swaged joint 145 (such as FIGS. 6 and 7). Some embodiments of a swaged joint 145 comprise a constriction section 148 and an expansion section 149. The constriction section 148 may be adjacent to the partition panel 301 and the expansion section 149. The expansion section 149 may be adjacent to the constriction section 148 and the intermediate section 144 of heat exchanger tube 140. In an embodiment, the expansion section 149 is adjacent to a constriction section 148 and a fluid contour section (as discussed in FIG. 7), where the fluid contour section is adjacent to the expansion section 149 and the intermediate section 144.

In some embodiments, the constriction section 148 may comprise any of end flare 147, lip flange 310, and at least a portion of shoulder 146. A portion of partition panel 301 side 302 may be adjacent to and/or transition into lip flange 310 that may form a portion of the outer surface 145b of swaged joint 145. The end flare 147 may be formed from at least a portion of heat exchanger tube 140, be transverse the centerline 150, and at least partially flush with a side of partition panel 301. In some embodiments, a portion of shoulder 146 may at least partially define a concave shape along the inner surface 145a with respect to the centerline 150. In an embodiment, both the constriction section 148 and the expansion section 149 comprise at least a portion of shoulder 146. The constriction section 148 and/or expansion section 149 may be configured to prevent relative movement between a panel (e.g. 301) and the heat exchanger tube 140 in a direction along the centerline 150. In an embodiment, at least a portion of any one of constriction section 148 and expansion section 149 is configured to be a seal throughout cyclical thermal heating and cooling, where the seal may be configured to have a gas flow emission limit (e.g., a predefined amount and/or rate of gaseous fluid leaking through a swaged joint), and/or configured to control combustion reaction yield, such as no more than any of 3, 14, and 40 nanograms of oxides of nitrogen per joule.

In an embodiment, a constriction section 148 may at least partially define a convex shape and/or a concave shape along an inner surface 145a with respect to centerline 150. Similarly, an expansion section 149 may at least partially define a concave shape along the inner surface 145b with respect to centerline 150. In some embodiments, the swaged joint 145 may further comprise a fluid contour section, such as the embodiments discussed in FIG. 7. A flow contour section may at least partially define a convex shape along the inner surface 145a with respect to the centerline 150. In some embodiments, at least one of the expanded section 149 or the flow contour section is configured to at least one of shape a flame and/or fluid of a gas flow and/or control heat release of a gas flow.

Figure 6:
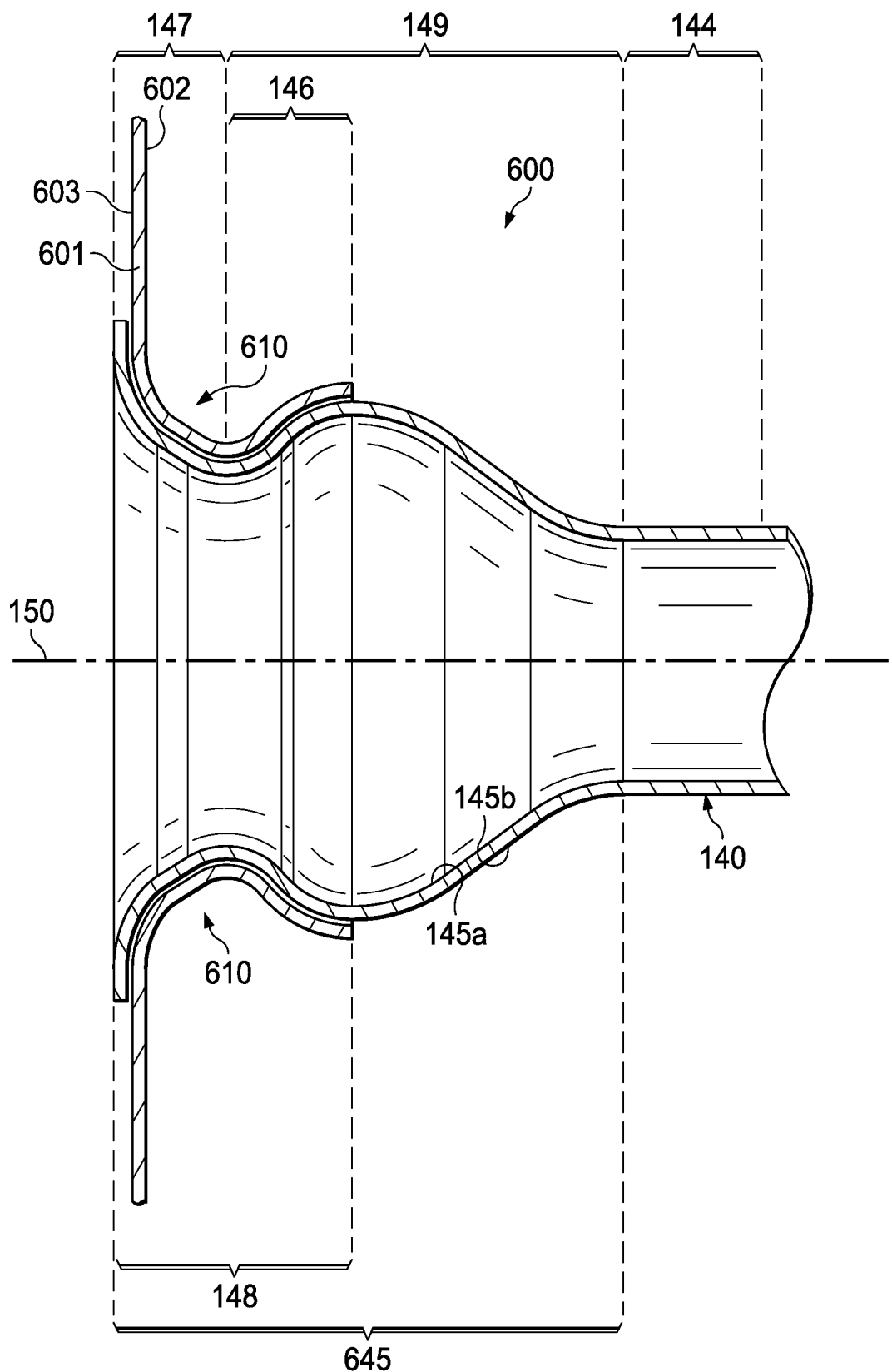
FIG. 6 is a cross-sectional view of another swaged joint section according to an embodiment of the disclosure.

Turning now to FIG. 6, a cross-section view of a swaged joint section 600 is disclosed according to an embodiment. In some embodiments, swaged joint section 600 may be substantially similar to or the same as swaged joint section 300. For example, swaged joint section 600 may comprise a swaged joint 645 that is adjacent to the intermediate section 144 of heat exchanger tube 140; however, panel 601 may not be the partition panel 301 as discussed in FIGS. 1-5. In an embodiment, panel 601 may be similar to the partition panel 301 of FIGS. 1-5, however, panel 601 may be located at an alternate location than second end 142 of heat exchanger tube 140, as discussed in FIG. 5. Some embodiments of swaged joint 645 comprise a portion of lip flange 610, where lip flange 610 may be formed from a portion of panel 601. Panel 601 may comprise a first side 602 and a second side 603, where the panel 601 may be incorporated as a structural member of a component of an HE system, such as HE system 100. For example, a burner box (such as burner box 130 of FIGS. 1 and 2) may comprise panel 601, where the heat exchanger tube 140 rigidly couples with at least a portion of the burner box comprising panel 601. Embodiments of swaged joint 645 may differ from swaged joint 145 because swaged joint 645 comprises at least a portion of lip flange 610. In some embodiments, the constriction section 148 may include at least a portion of lip flange 610, such as the shoulder 146. Similarly, end flare 147 may be at least partially flush with at least a portion of lip flange 610 and/or second side 603 of panel 601. It is understood that swaged joint 645 may comprise at least a portion of panel 601, such as lip flange 610, and be configured to be in fluid communication with an opening defined at least in part by panel 601. It is also understood that similar and/or the same as partition panel 301, at least a portion of panel 601 may be, but not limited to, any of axially swaged, radially swaged, and/or longitudinally swaged with at least a portion of heat exchanger tube 140, where the swaged joint 645 may be configured to form an interference fit between at least the inner surface 145a and outer surface 145b. As discussed above, swaged joint section 600 may rigidly couple a heat exchanger tube 140 with a panel 601 by a swaged joint 645, where the heat exchanger tube 600 is a gas-fired tube, and the swaged joint 645 may be configured to operatively engage with at least a portion of a gas-fired tube. It is understood that multiple embodiments of a swaged joint section, such as 300, 600 and/or 700, may co-exist within the same HE system, and their disposition within a HE system may depend in part on proximate HE system components.

Figure 7:
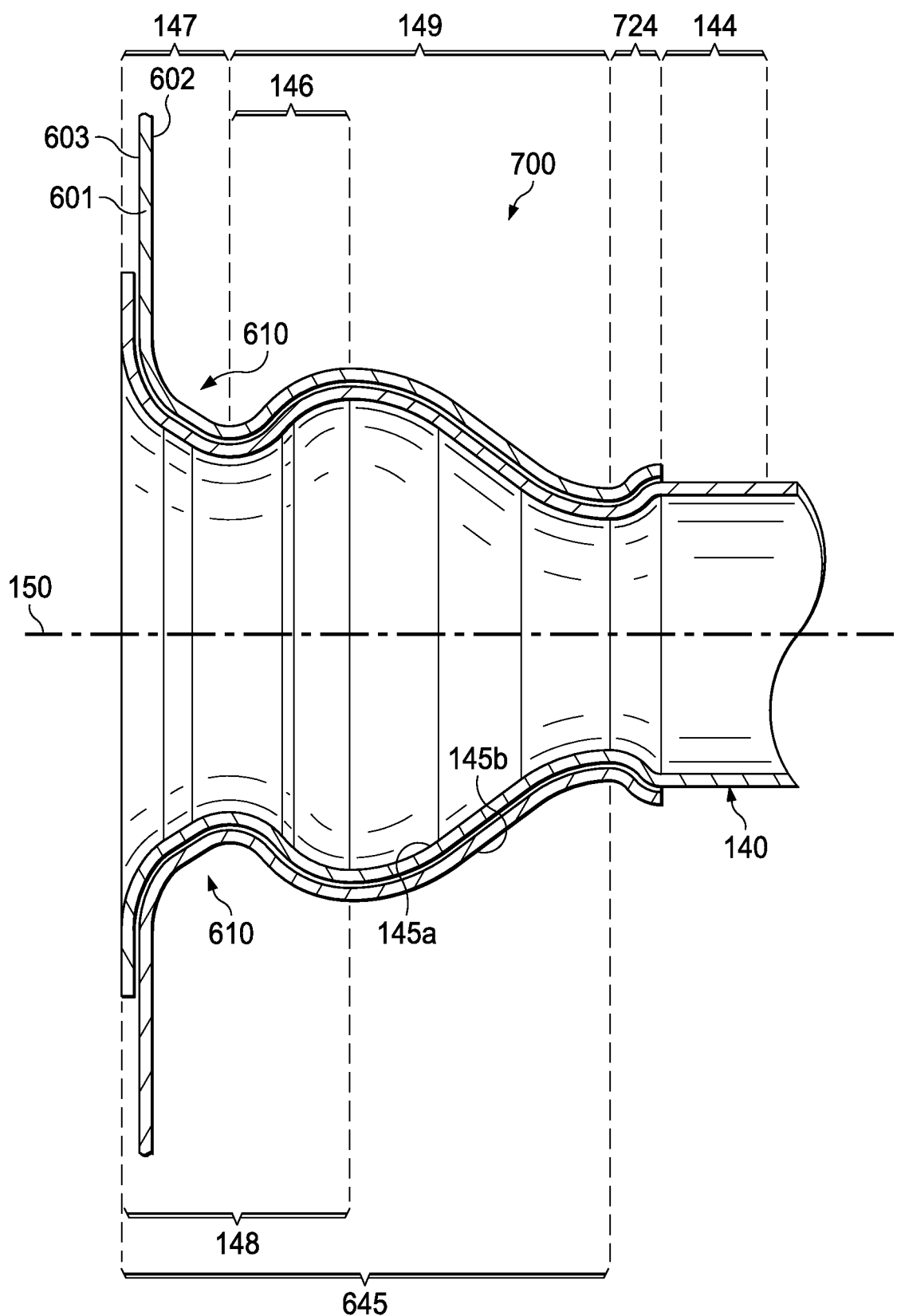
FIG. 7 is a cross-sectional view of another swaged joint section according to an embodiment of the disclosure.

Turning now to FIG. 7, an embodiment of swaged joint section 700 comprises swaged joint 645 that is adjacent to intermediate section 144 of heat exchanger tube 140. In some embodiments, swaged joint section 700 may be substantially similar to or the same as swaged joint section 600. In an embodiment, swaged joint section 645 further comprises a fluid contour section 724, where the fluid contour section 724 may be configured to shape a gas flow and/or fluid, such as a fluid exiting a burner. Some embodiments of fluid contour section 724 may be configured to at least partially define a convex shape along the inner surface 145a with respect to centerline 150. Additionally, some embodiments of swaged joint 645 may comprise lip flange 610 extending along the outer surface 145b of swaged joint 645, such as between at least a portion of any of constriction section 148, expansion section 149, and fluid contour section 724. A fluid contour section 724 may be configured to be a second shoulder, similar and/or substantially the same as shoulder 146, where at least a portion of fluid contour section 724 prevents relative movement between heat exchanger tube 140 and panel 601 along a longitudinal direction of centerline 150. A fluid contour section 724 may be adjacent to and between expansion section 149 and intermediate section 144 of heat exchanger tube 140. Similarly, an expansion section 149 may be adjacent to both a fluid contouring section 724 and at least a portion of constriction section 148. Some embodiments of swaged joint 645 of swaged joint section 700 may comprise expansion section 149 that comprises at least a portion of shoulder 146. Similarly, a constriction section 148 of swaged joint 645 may comprise end flare 147 and at least a portion of shoulder 146.

Embodiments of a method of sealing a heat exchanger tube with a panel are disclosed, where the heat exchanger tube and panel may be of a heat exchange system. In an embodiment, the method comprises a step of forming a lip flange from the panel comprising a defined opening, where at least a portion of the lip flange may surround the opening. In some embodiments of the method, a heat exchanger tube at least partially extends longitudinally along a centerline, where the heat exchanger tube may comprise an intermediate section that is adjacent to a swaged joint. Some embodiments of forming the lip flange from the panel may comprise expanding the opening of the panel to protrude the lip flange from a side of the panel that is opposite the side of the panel that is generally flush with the end flare. A heat exchanger tube may be a gas-fired tube that is configured to be in fluid communication with a gas flow from a burner for at least partially premixed air and fuel.

The method may comprise the step of surrounding at least a portion of an end of the heat exchanger tube with at least a portion of the lip flange. Some embodiments of the method comprise the step of swaging the heat exchanger tube any of axially, radially, or longitudinally with another component, such as the lip flange. Swaging the heat exchanger tube (e.g., radially) with the lip flange may form the swaged joint that may be configured to maintain a seal throughout cyclical thermal heating and cooling in operations of a heat exchange system. In an embodiment, the step of swaging the heat exchanger tube with the lip flange of the panel to form a swaged joint may comprise forming a constriction section, where the constriction section may at least partially define a convex shape along an inner surface of the swaged joint with respect to the centerline. In an embodiment, the step of swaging the heat exchanger tube with the lip flange of the panel to form a swaged joint may comprise forming a shoulder that may at least partially define s a concave shape along the inner surface with respect to the centerline.

The method may comprise a step of preventing relative longitudinal movement between the panel and the heat exchanger tube along the centerline using the swaged joint. Some embodiments may prevent relative longitudinal movement between the panel and the heat exchanger tube along the centerline using any of an end flare and/or shoulder. The method may comprise a step of expanding the heat exchanger tube radially from the centerline such that at least a portion of the heat exchanger tube frictionally contacts and/or frictionally engages at least a portion of the lip flange of the panel.

The method may comprise a step of shaping at least a portion of the swaged joint between the end flare and the intermediate section. In some embodiments, shaping at least a portion of the swaged joint may define at least one of an expanded section and a flow contour section. An expanded section may define a concave shape, that is, some embodiments of shaping at least a portion of the swaged joint to define an expanded section may define a concave shape along at least a portion of the inner surface of the swaged joint with respect to the centerline. Similarly, the flow contour section may define a convex shape, that is, some embodiments of shaping at least a portion of the swaged joint to define a flow contour section may define a convex shape along at least a portion of the inner surface of the swaged joint with respect to the centerline. In an embodiment, the step of shaping at least a portion of the swaged joint may configure the swaged joint to avoid direct impingement of a fluid gas flow (e.g., hot flue gases) on at least a portion of the swaged joint to control the temperature of the swaged joint structure. Similarly, in an embodiment, at least one of the expanded section and the flow contour section may be configured to at least one of shape a fluid gas flow and/or control heat release of fluid gas flow and/or control material temperature of the swaged joint by avoiding direct impingement of fluid gas flow on at least a portion of the swaged joint.

The method may comprise a step of creating an interference fit using the swaged joint, where the interference fit may be no more than 0.005 inches per inch of diameter of the swaged joint. In some embodiments, the method comprises a step of forming a seal with the swaged joint—that is the swaged joint may form a seal that prevents leakage of gaseous emissions, such as leakage from a fluid gas flow inside the heat exchanger tube, through the swaged joint, and to a conditioned environment and/or conditioned air flow. In some embodiments, the swaged joint forms a seal using only at least a portion of the heat exchanger tube and at least a portion of the lip flange of the panel. In an embodiment, forming a seal with the swaged joint may configure the swaged joint to have a gas flow emission limit (e.g., a predefined amount and/or rate of gaseous fluid leaking through a swaged joint or other joints) of no more than a predetermined amount of products of combustion, such as no more than about 1% of products of combustion or a particular subset thereof.

It is understood that while embodiments of the method disclosed herein have been arranged in a particular order, the particular sequence of steps described is merely exemplary. The sequence of steps of the method described herein may be altered without deviating from the scope of the present disclosure. It is understood that the method described herein may refer to structures, components, and/or systems previously disclosed above, and—for brevity—similarly named references may be substantially similar and/or the same as embodiments previously disclosed.

It is understood that at least one embodiment is disclosed herein, and variations, combinations, and/or modifications of the disclosed embodiment(s) and/or features therein made by a person having ordinary skill in the art, are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

The present discussion has been described in particular detail with respect to one possible embodiment. Those of skill in the art will appreciate that the invention may be practiced in other embodiments. First, the particular naming of the components, capitalization of terms, the attributes, structures, or any other structural aspect is not mandatory or significant, and the mechanisms that implement the present disclosure or its features may have different names, formats, or protocols. Also, the particular division of functionality between the various components described herein is merely exemplary, and not mandatory; functions performed by a single system component may instead be performed by multiple components, and functions performed by multiple components instead may be performed by a single component. Finally, it should be noted that the language used in the specification bas been principally selected for readability and instructional purposes, and may not have been selected to delineate or circumscribe the subject matter. Accordingly, the disclosure is intended to be illustrative of the scope, but not limiting. Thus, the scope of protection is not limited by the description set out above but is defined by the claims that follow; that scope including all equivalents of the subject matter of the claims. Each and every claim is incorporated as further disclosure into the specification and the claims are embodiment(s) of the present disclosure.

Having described the various systems and methods herein, various embodiments of the systems and methods can include, but are not limited to:

In a first embodiment, A heat exchange system for heating, ventilation, and air conditioning (HVAC), the heat exchange system comprising: a burner box, a hot collector box, a heat exchanger tube that is disposed between, and in fluid communication with, the hot collector box and the burner box, wherein the heat exchanger tube is rigidly connected to at least one of the hot collector box or burner box by a swaged joint.

A second embodiment may include the heat exchange system of the first embodiment, further comprising: a circulation air blower, an air and fuel mixing unit that is configured to be in fluid communication with the burner box, a burner that is configured to be in fluid communication with the burner box, wherein the burner is gas-fired and is configured to be in fluid communication with a gas flow that is an at least partially combined mixture of air and fuel.

A third embodiment may include the heat exchange system of the second embodiment, wherein the air and fuel mixing unit is configured to combine a received predefined volumetric flow rate of air and a predefined volumetric flow rate of fuel such that the gas flow that is an at least partially combined mixture of air and fuel is in fluid communication with the burner.

A fourth embodiment may include the heat exchange system of the second embodiment, wherein the swaged joint is configured to maintain a seal during cyclical temperature loads of thermal heating and cooling.

A fifth embodiment may include the heat exchange system of the fourth embodiment, wherein the swaged joint comprises a fluid contour section that is configured to at least one of control down-stream heat release from the gas flow or at least partially shape a combustion fluid exiting the burner.

A sixth embodiment may include the heat exchange system of the second embodiment, wherein the swaged joint is radially swaged with respect to a centerline, and wherein the swaged joint is configured to form a hermetic seal or substantially hermetic seal using only the heat exchanger tube and at least one of a burner box panel, a hot collector box panel, or a partition panel.

A seventh embodiment may include the heat exchange system of the second embodiment, wherein the swaged joint comprises a constriction section and expansion section.

An eighth embodiment may include the heat exchange system of the seventh embodiment, wherein the constriction section comprises a lip flange of a panel and an end flare, wherein the panel comprises a defined opening.

A ninth embodiment may include the heat exchange system of the eighth embodiment, wherein the expansion section comprises a shoulder that defines a concave shape along an inner surface of the heat exchanger tube with respect to a centerline.

A tenth embodiment may include the heat exchange system of the ninth embodiment, wherein at least a portion of the constriction section and at least a portion of the expansion section are configured to form a seal that provides for combustion with no more than about 14 nanograms of oxides of nitrogen per joule.

An eleventh embodiment may include the heat exchange system of the ninth embodiment, wherein at least one of the burner box or the hot collector box comprises the panel that comprises the defined opening.

A twelfth embodiment may include the heat exchange system of the second embodiment, wherein the burner comprises a cavity burner, an in-shot burner, a flat burner, a porous ceramic burner, a convective burners, an infrared burners, or any combination thereof.

In a thirteenth embodiment, a swaged joint is disclosed, comprising: a constriction section comprising a lip flange of a panel with a defined opening, and an end flare of a heat exchanger tube; and an expansion section comprising a shoulder, wherein the expansion section is adjacent to the constriction section and between the constriction section and an intermediate section of the heat exchanger tube.

A fourteenth embodiment may include the swaged joint of the thirteenth embodiment, wherein the burner comprises a cavity burner, an in-shot burner, a flat burner, a porous ceramic burner, a convective burners, an infrared burners, or any combination thereof.

A fifteenth embodiment may include the swaged joint of the fourteenth embodiment, wherein the heat exchanger tube and opening defined by the panel are axially aligned with a centerline extending longitudinally, and wherein at least a portion of the heat exchanger tube is radially swaged with at least a portion of the inner surface of the lip flange.

A sixteenth embodiment may include the swaged joint of the fifteenth embodiment, wherein the end flare is transverse to the centerline and is at least partially flush with a side surface of the panel.

A seventeenth embodiment may include the swaged joint of the thirteenth embodiment, wherein the constriction section further comprises at least a portion of the shoulder.

An eighteenth embodiment may include the swaged joint of the seventeenth embodiment, wherein the constriction section at least partially defines a convex shape along the inner surface with respect to the centerline.

A nineteenth embodiment may include the swaged joint of the seventeenth embodiment, wherein at least the constriction section and expansion section are configured to be a seal throughout cyclical thermal heating and cooling.

A twentieth embodiment may include the swaged joint of the eighteenth embodiment, wherein the constriction section and expansion section are configured to prevent relative movement between the panel and the heat exchanger tube in a direction along the centerline.

A twenty-first embodiment may include the swaged joint of the fifteenth embodiment, wherein at least a portion of the shoulder defines a concave shape along the inner surface with respect to the centerline.

A twenty-second embodiment may include the swaged joint of the thirteenth embodiment, wherein the defined opening and heat exchanger tube are configured to be in fluid communication with each other, and wherein the heat exchanger tube is a gas-fired tube that is configured to be in fluid communication with a gas flow from a burner for at least partially premixed air and fuel.

A twenty-third embodiment may include the swaged joint of the thirteenth embodiment, wherein the swaged joint has an interference fit that is no more than 0.005 inches per inch of diameter of the swaged joint.

A twenty-fourth embodiment may include the swaged joint of the nineteenth embodiment, wherein at least a portion of the constriction section and at least a portion the of expansion section are configured to form a seal that allows for maintenance of combustion fluids at or below about 14 nanograms of oxides of nitrogen per joule.

A twenty-fifth embodiment may include the swaged joint of the fourteenth embodiment, further comprising a flow contour section that is adjacent to and between the expansion section and the intermediate section of the heat exchanger tube.

A twenty-sixth embodiment may include the swaged joint of the twenty-fifth embodiment, wherein the flow contour section at least partially defines a convex shape along the inner surface with respect to the centerline.

A twenty-seventh embodiment may include the swaged joint of the twenty-sixth embodiment, wherein at least one of the expanded section or the flow contour section is configured to at least one of shape a fluid in a gas flow or control heat release of a gas flow.

In a twenty-eighth embodiment, a method of sealing a heat exchanger tube with a panel of a heat exchange system is disclosed, the method comprising: forming a lip flange from the panel having a defined opening, wherein at least a portion of the lip flange surrounds the opening, wherein the heat exchanger tube at least partially extends longitudinally along a centerline, and comprises an intermediate section that is adjacent to a swaged joint; surrounding at least a portion of an end of the heat exchanger tube with at least a portion of the lip flange; forming an end flare from an end of the heat exchanger tube such that the end flare is transverse to the centerline and is at least partially flush with a side of the panel; and swaging the heat exchanger tube radially with the lip flange to form the swaged joint that is configured to maintain a seal throughout cyclical thermal heating and cooling.

A twenty-ninth embodiment may include the method of the twenty-eighth embodiment, wherein forming the lip flange from the panel comprises expansion the opening of the panel to protrude the lip flange from a side of the panel that is opposite the side of the panel that is generally flush with the end flare.

A thirtieth embodiment may include the method of the twenty-eighth embodiment, wherein swaging the heat exchanger tube with the lip flange of the panel to form a swaged joint comprises: forming a constriction section that at least partially defines a convex shape along an inner surface with respect to the centerline.

A thirty-first embodiment may include the method of the thirtieth embodiment, wherein swaging the heat exchanger tube with the lip flange of the panel to form a swaged joint further comprises: forming a shoulder that at least partially defines a concave shape along the inner surface with respect to the centerline.

A thirty-second embodiment may include the method of the twenty-eighth embodiment, further comprising: preventing relative longitudinal movement between the panel and the heat exchanger tube along the centerline using the end flare.

A thirty-third embodiment may include the method of the thirty-first embodiment, further comprising: preventing relative movement between the panel and the heat exchanger tube in a direction along the centerline using the shoulder.

A thirty-fourth embodiment may include the method of the twenty-eighth embodiment, further comprising: expanding the heat exchanger tube radially from the centerline such that at least a portion of heat exchanger tube frictionally contacts the lip flange of the panel.

A thirty-fifth embodiment may include the method of the thirty-first embodiment, further comprising: shaping at least a portion of the swaged joint between the end flare and the intermediate section, wherein shaping at least a portion of the swaged joint defines at least one of an expanded section and a flow contour section.

A thirty-sixth embodiment may include the method of the thirty-fifth embodiment, wherein the expanded section defines a concave shape along at least a portion of the inner surface with respect to the centerline.

A thirty-seventh embodiment may include the method of any of the thirty-fifth embodiment or the thirty-sixth embodiment, wherein the flow contour section defines a convex shape along at least a portion of the inner surface with respect to the centerline.

A thirty-eighth embodiment may include the method of any of the thirty-fifth embodiment, thirty-sixth embodiment, or the thirty-seventh embodiment, wherein at least one of the expanded section and the flow contour section is configured to at least one of shape gas flow or control heat release of gas flow.

A thirty-ninth embodiment may include the method of the thirty-fourth embodiment, further comprising: creating an interference fit using the swaged joint that is no more than 0.005 inches per inch of diameter of the swaged joint.

A fortieth embodiment may include the method of the twenty-eighth embodiment, further comprising: forming a seal with the swaged joint using only at least a portion of the heat exchanger tube and at least a portion of the lip flange of the panel.

A forty-first embodiment may include the method of the twenty-eighth embodiment, wherein the heat exchanger tube is a gas-fired tube that is configured to be in fluid communication with a gas flow from a burner for at least partially premixed air and fuel.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A joint comprising:
   a lip flange of a panel with a defined opening;
   an end flare of a heat exchanger tube;
   a constriction section in which the lip flange is disposed about the end flare;
   an expansion section comprising a shoulder, wherein the expansion section is adjacent to the constriction section and between the constriction section and an intermediate section of the heat exchanger tube, and wherein a contour of the lip flange is equal to a contour of the end flare along the constriction section; and
   a fluid contour section that is adjacent to and between the expansion section and the intermediate section of the heat exchanger tube;
   wherein the contour of the lip flange comprises:
      a first concavity along the constriction section;
      a first convexity along the expansion section;
      a second concavity along the expansion section; and
      a second convexity along the fluid contour section;
   wherein the first convexity is adjacent to the first and second concavities, and the second convexity is adjacent to the second concavity; and
   wherein the contours of the lip flange and the end flare extend from the panel and are configured to prevent relative movement, along a longitudinal axis of the heat exchanger tube, between the heat exchanger tube and the panel.

2. The joint of claim 1, wherein the shoulder is at least partially defined by the first convexity; and
   wherein the joint comprises a second shoulder that is at least partially defined by the second convexity.

3. The joint of claim 1, wherein the joint has an inner surface that is configured to be in fluid communication with a gas flow.

4. The joint of claim 3,
   wherein the heat exchanger tube and opening defined by the panel are axially aligned with a centerline extending longitudinally, and
   wherein at least a portion of the heat exchanger tube is radially swaged with at least a portion of the inner surface of the lip flange.

5. The joint of claim 3, wherein the fluid contour section is configured to at least one of control fluid gas flow along a flow path or shape the fluid gas flow away from the joint, thereby reducing temperature of the joint.

6. The joint of claim 3, wherein the end flare is transverse to the centerline and is at least partially flush with a side surface of the panel.

7. The joint of claim 1, wherein the defined opening and heat exchanger tube are in fluid communication with each other, and wherein the heat exchanger tube is in fluid communication with a gas flow from a burner, wherein the gas flow comprises at least partially premixed air and fuel.

8. The joint of claim 1, wherein the joint has an interference fit that is less than about 0.010 inches per inch of diameter of the joint.

9. A heat exchange system for heating, ventilation, and air conditioning (HVAC) comprising:
   a burner box;
   a hot collector box; and
   a heat exchanger tube that is disposed between, and in fluid communication with, the hot collector box and the burner box, wherein the heat exchanger tube is rigidly connected to at least one of the hot collector box or burner box by a joint, wherein the joint comprises:
      a constriction section comprising a lip flange of a panel with a defined opening, and an end flare of a heat exchanger tube;
      an expansion section comprising a shoulder, wherein the expansion section is adjacent to the constriction section and between the constriction section and an intermediate section of the heat exchanger tube, and wherein a contour of the lip flange is equal to a contour of the end flare along the constriction section; and
      a fluid contour section that is adjacent to and between the expansion section and the intermediate section of the heat exchanger tube;
      wherein the contour of the lip flange comprises:
         a first concavity along the constriction section;
         a first convexity along the expansion section;
         a second concavity along the expansion section; and
         a second convexity along the fluid contour section;
         wherein the first convexity is adjacent to the first and second concavities, and the second convexity is adjacent to the second concavity; and
         wherein the contours of the lip flange and the end flare extend from the panel and are configured to prevent relative movement, along a longitudinal axis of the heat exchanger tube, between the heat exchanger tube and the panel.

10. The heat exchange system of claim 9, further comprising:
    a circulation air blower;
    an air and fuel mixing unit that is configured to be in fluid communication with the burner box; and
    a burner that is configured to be in fluid communication with the burner box, wherein the burner is gas-fired and is configured to be in fluid communication with a gas flow that is an at least partially combined mixture of air and fuel.

11. The heat exchange system of claim 10, wherein the air and fuel mixing unit is configured to combine a received predefined volumetric flow rate of air and a predefined volumetric flow rate of fuel such that the gas flow that is an at least partially combined mixture of air and fuel is in fluid communication with the burner.

12. The heat exchange system of claim 10, wherein the joint is configured to maintain a seal during cyclical temperature loads of thermal heating and cooling, and wherein the fluid contour section is configured to at least one of control down-stream heat release from the gas flow or at least partially shape a combustion fluid exiting the burner.

13. The heat exchange system of claim 10, wherein the joint is radially swaged with respect to a centerline, and wherein the joint is configured to form a hermetic seal or substantially hermetic seal using only the heat exchanger tube and at least one of a burner box panel, a hot collector box panel, or a partition panel.

14. The heat exchange system of claim 10, wherein at least a portion of the constriction section and at least a portion of the expansion section are configured to form a seal that provides for combustion with no more than about 14 nanograms of oxides of nitrogen per joule.

15. The heat exchange system of claim 10, wherein the burner comprises a cavity burner, an in-shot burner, a flat burner, a porous ceramic burner, a convective burner, an infrared burner, or any combination thereof.

16. A method of sealing a heat exchanger tube with a panel of a heat exchange system, the method comprising:
   forming a lip flange from the panel having a defined opening, wherein at least a portion of the lip flange surrounds the opening, and wherein the heat exchanger tube at least partially extends longitudinally along a centerline, and comprises an intermediate section that is adjacent to a joint;
   surrounding at least a portion of an end of the heat exchanger tube with at least a portion of the lip flange;
   forming an end flare from an end of the heat exchanger tube such that the end flare is transverse to the centerline and is at least partially flush with a side of the panel; and
   swaging the heat exchanger tube radially with the lip flange to form the joint that is configured to maintain a seal throughout cyclical thermal heating and cooling, wherein the joint comprises:
      a constriction section in which the lip flange is disposed about the end flare;
      an expansion section comprising a shoulder, wherein the expansion section is adjacent to the constriction section and between the constriction section and the intermediate section of the heat exchanger tube, and wherein a contour of the lip flange is equal to a contour of the end flare along the constriction section; and
      a fluid contour section that is adjacent to and between the expansion section and the intermediate section of the heat exchanger tube;
      wherein the contour of the lip flange comprises:
         a first concavity along the constriction section;
         a first convexity along the expansion section;
         a second concavity along the expansion section; and
         a second convexity along the fluid contour section;
         wherein the first convexity is adjacent to the first and second concavities, and the second convexity is adjacent to the second concavity; and
         wherein the contours of the lip flange and the end flare extend from the panel and are configured to prevent relative movement, along a longitudinal axis of the heat exchanger tube, between the heat exchanger tube and the panel.

17. The method of claim 16, wherein forming the lip flange from the panel comprises expansion of the opening of the panel to protrude the lip flange from a side of the panel that is opposite the side of the panel that is generally flush with the end flare.

18. The method of claim 16, further comprising: expanding the heat exchanger tube radially from the centerline such that at least a portion of the heat exchanger tube frictionally contacts the lip flange of the panel.

19. The method of claim 18, further comprising: creating an interference fit using the joint that is less than about 0.010 inches per inch of diameter of the joint.

20. The method of claim 16, further comprising: forming a seal with the joint using only at least a portion of the heat exchanger tube and at least a portion of the lip flange of the panel.

* * * * *